(12) United States Patent
Harshey et al.

(10) Patent No.: US 10,720,838 B1
(45) Date of Patent: Jul. 21, 2020

(54) FORCED-BURST VOLTAGE REGULATION FOR BURST-MODE DC-DC CONVERTERS

(71) Applicant: NXP B.V., Eindhoven (NL)

(72) Inventors: Jitendra Prabhakar Harshey, Bangalore (IN); Olivier Trescases, Toronto (CA); Edevaldo Pereira Da Silva Junior, Austin, TX (US); Stefano Pietri, Austin, TX (US); Jurgen Geerlings, Eindhoven (NL); Hendrik Johannes Bergveld, Eindhoven (NL)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 16/431,927

(22) Filed: Jun. 5, 2019

(51) Int. Cl.
  *H02M 3/158* (2006.01)
  *H02M 1/00* (2006.01)
  *G05F 1/56* (2006.01)
  *G05F 1/52* (2006.01)

(52) U.S. Cl.
  CPC .............. *H02M 3/158* (2013.01); *G05F 1/52* (2013.01); *G05F 1/56* (2013.01); *H02M 1/0061* (2013.01); *H02M 2001/0003* (2013.01)

(58) Field of Classification Search
  CPC ............... H02M 3/158; H02M 1/0061; H02M 2001/0003; G05F 1/52; G05F 1/56
  See application file for complete search history.

(56) References Cited

U.S. PATENT DOCUMENTS

| 7,030,596 | B1 * | 4/2006 | Salerno | H02M 3/158 323/282 |
|---|---|---|---|---|
| 8,786,264 | B2 | 7/2014 | Muhammad | |
| 9,071,143 | B2 | 6/2015 | Teh | |
| 9,152,193 | B2 | 10/2015 | Costa et al. | |
| 9,450,492 | B1 * | 9/2016 | Bizjak | H02M 3/158 |
| 10,003,208 | B2 | 6/2018 | Villar Pique et al. | |
| 2011/0243216 | A1 | 10/2011 | Yoshioka et al. | |
| 2013/0176011 | A1 | 7/2013 | Muhammad | |
| 2013/0332765 | A1 | 12/2013 | Costa et al. | |
| 2014/0009970 | A1 | 1/2014 | Brinlee et al. | |
| 2018/0054109 | A1 | 2/2018 | Zhang et al. | |

OTHER PUBLICATIONS

"Multimode Low-Power Buck Converter," Datasheet, Texas Instruments, 2000 (Year: 2000).*

* cited by examiner

*Primary Examiner* — Kyle J Moody
*Assistant Examiner* — Jye-June Lee (57) ABSTRACT

Embodiments provide forced-burst voltage regulation for burst mode direct-current-to-direct-current (DC-DC) converters in integrated circuits. The DC-DC converter generates an output voltage and operates in a burst mode to raise the output voltage to a threshold voltage. A controller is coupled to the DC-DC converter. In operation, the DC-DC converter is configured to perform the burst mode based upon a low-voltage detection for the output voltage. The DC-DC converter is further configured to perform the burst mode when a force-burst command is asserted by the controller to the DC-DC converter regardless of a state for the low-voltage detection. For one embodiment, the force-burst command is asserted as a burst control signal from the controller to the DC-DC converter to generate a long quiet period for sensitive actions. For another embodiment, the force-burst command is asserted using enable and refresh control signals to facilitate low-power operation.

17 Claims, 4 Drawing Sheets

FORCED-BURST VOLTAGE REGULATION FOR BURST-MODE DC-DC CONVERTERS

TECHNICAL FIELD

This technical field relates to direct-current-to-direct-current (DC-DC) voltage converters and related voltage regulation for integrated circuits.

BACKGROUND

Many current electronic products rely upon low-power or battery-powered operation of one or more integrated circuits (ICs). These integrated circuits can be used in a wide variety of low-power or battery-operated applications including, for example, mobile phones, smart watches, sensing applications, or other low-power or battery-operated devices or applications. For many low-power ICs, an external voltage (e.g., battery) is converted to a lower voltage and regulated on-chip using a DC-DC converter that operates using switched output drivers that control power switches to control energy storage and release to reactive components. The DC-DC converters are controlled to maintain an output voltage that is provided to a load on the integrated circuit.

Compared to a linear regulator, a DC-DC converter, whether using capacitive or inductive reactive components, can achieve a higher power efficiency, especially for large differences between the higher input voltage and the lower output voltage. Compared to using capacitive reactive components, using an inductive DC-DC converter has the advantage that for varying input and/or desired output voltages, the desired output voltage can be maintained by changing the timing of how the power switches are controlled, instead of changing the voltage conversion topology as would be needed for a capacitive DC-DC converter. However, maintaining a good power efficiency at low output power still remains a challenge.

Applying burst-mode control has advantages because good power efficiency can be maintained over a large load-current range. In conventional burst-mode DC-DC converters, the voltage regulation control is designed such that the DC-DC converter only performs burst-mode switching when the output voltage drops below a certain defined low-voltage threshold. This minimizes the converter switching actions and increases efficiency, especially for low output power since the DC-DC converter only switches when really needed. For burst-mode DC-DC converters, a burst mode including one or more current charging cycles is performed by the DC-DC converter for a short period of time after detecting an output voltage below a low-voltage threshold. During burst mode, the DC-DC converter typically operates in continuous-conduction mode (CCM) with a controlled inductor current while ramping up the output voltage from a defined lower level to a defined upper level for a voltage regulation window. Thus, the output voltage of such a burst-mode DC-DC converter is controlled to be within the high-voltage threshold and the low-voltage threshold for the voltage regulation window.

For burst-mode implementations, the switching activity of the DC-DC converter increases with the load current. If the load current increases, the output capacitor for the DC-DC converter is drained faster. As soon as the low-voltage threshold of the voltage regulation window is reached, a burst is started. For high load conditions, an increased number of bursts with a longer duration are required because the load current subtracts from the inductor current during the burst. The resulting lower current into the output capacitor causes the output voltage to rise more slowly. Thus, the burst frequency and burst duration depend on the load current. Further, within the burst, output current is typically controlled to yield a certain average burst inductor current, for example by controlling the valley and peak currents. As soon as the high-voltage threshold is reached, the burst is ended and the DC-DC converter stops switching while the load draws current from the output capacitor until the low-voltage threshold of the voltage regulation window is again reached. At this point, the burst cycle repeats.

The switching action of burst-mode DC-DC converters during such burst modes can cause interference with sensitive circuits, such as analog signals, on an integrated circuit. For example, if an action by a sensitive circuit elsewhere in the system coincides with the switching action of the DC-DC converter during a burst mode, accuracy or performance of the action can be compromised. One example for such a sensitive action is the sampling of an analog input voltage by an analog-to-digital converter (ADC). If this sampling occurs during burst-mode switching for the DC-DC converter, accuracy of the ADC measurement can be degraded.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Embodiments are disclosed that provide forced-burst voltage regulation for burst mode DC-DC converters in integrated circuits. The disclosed embodiments add a force-burst command as an input to a burst-mode DC-DC converter so that the DC-DC converter can be controlled to start a burst to increase output voltage even though a low-voltage threshold has not been reached. A variety of additional or different features and variations can be implemented.

For one embodiment, the disclosed embodiments provide a burst-mode DC-DC converter, where the start of a burst can be forced by an external system controller at any time using a burst control signal. In normal operation, a burst is started autonomously by the DC-DC converter when its output voltage drops below the low-voltage threshold of the voltage regulation window. With the added feature of starting a burst at any time, the time between bursts can be increased or maximized. For example, the time between bursts can be increased or maximized to the time it takes the load to discharge an output capacitor from a high-voltage threshold for the voltage regulation window to the low-voltage threshold. After a burst has been forced to occur by the force-burst command, this increased or maximized time where the DC-DC converter is not switching in a burst can be used to perform sensitive actions within the integrated circuit. For example, actions by a circuit sensitive to interference, such as sampling an analog input performed by an analog-to-digital converter (ADC), can occur during this quiet time after a force-burst mode has completed. After the burst has been forced to start by an external system controller via the force-burst control signal, the DC-DC converter will pump up the output voltage to the high-voltage threshold and reduce an output inductor current to zero. Then, the end of the burst is signaled to the external system controller by the DC-DC converter, indicating that the quiet period has started. The external system controller can use this signal as a trigger to perform a sensitive task, such as sampling an analog input for an ADC. In this embodiment, the DC-DC converter remains enabled during the burst and during the time between bursts, but its switching activity is influenced by the external system controller to create long-as-possible quiet periods between the influenced timing of the bursts.

For another embodiment, the DC-DC converter is actually disabled between bursts by the external system controller. This allows a high power efficiency even for very low load currents because the DC-DC converter only draws leakage current between bursts. The switching activity of the DC-DC converter can again be influenced by the external system controller. For example, the DC-DC converter can be enabled after a certain time has elapsed or when an external ultra-low-power voltage monitor connected to the DC-DC converter output voltage detects a pre-determined condition during the power-down mode of the DC-DC converter. The external system controller forces a burst to start by enabling the DC-DC converter to replenish charge in the output capacitor, after which the DC-DC converter is switched off completely when the burst has ended. If a timer is used to force the start of a new burst, this timer is then restarted. This refresh operation keeps the total system quiescent current to a minimum between bursts, which allows high system efficiency even at very low loads. Low loads can be, for example, in the micro-amp (µA) range such as from 2 µA to 500 µA. Thus, this additional embodiment for the force—burst mode described herein is to reduce quiescent power usage for the overall system and to use the DC-DC converter to replenish the output capacitor at a reduced frequency as compared to normal operations.

Figure 1A:
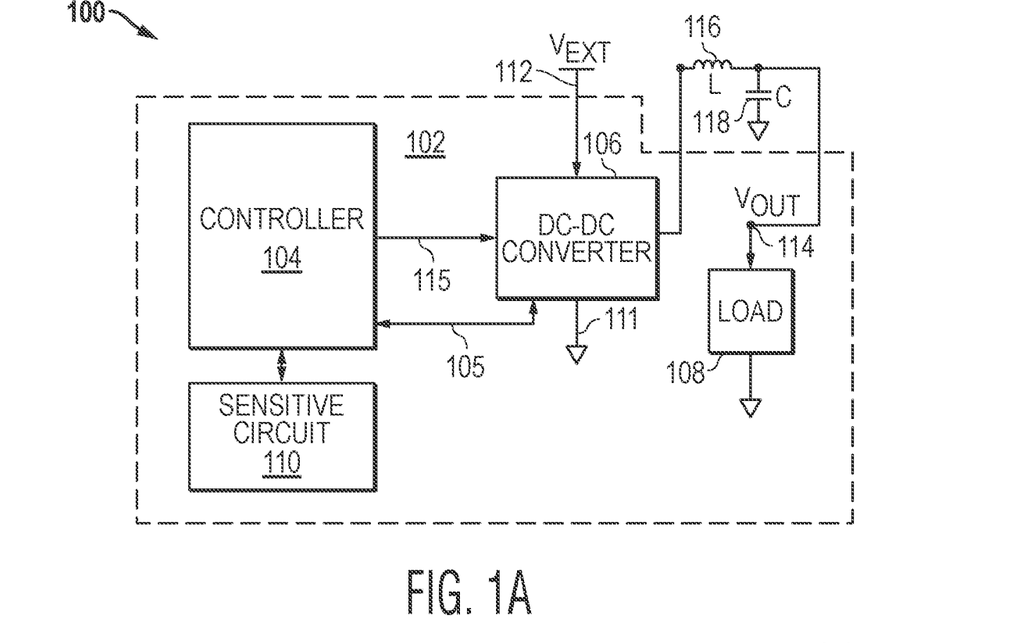
FIG. 1A is a block diagram of an example embodiment including an integrated circuit having a DC-DC converter controlled in part by a force-burst command.
Figure 1B:
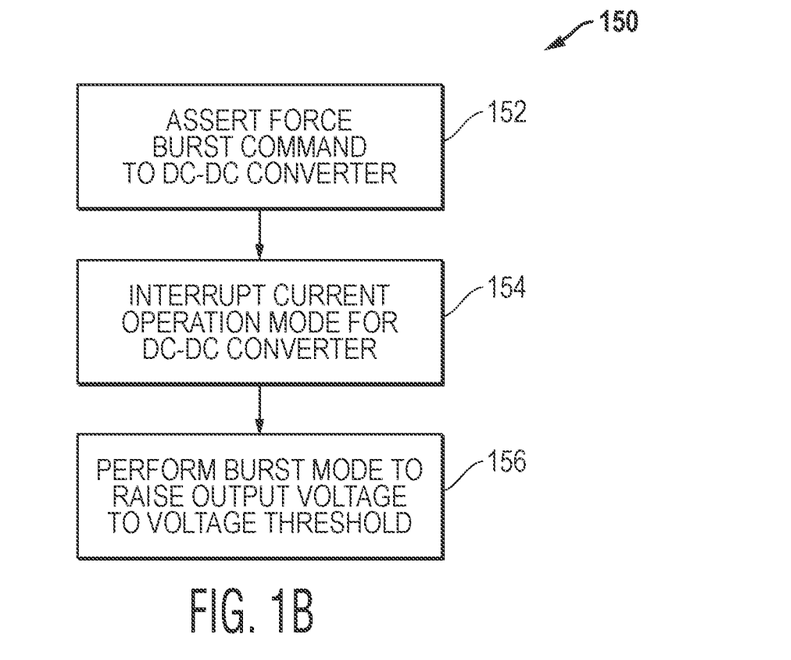
FIG. 1B is a flow diagram of an example embodiment to force a burst to be performed by a burst-mode DC-DC converter.
Figure 2:
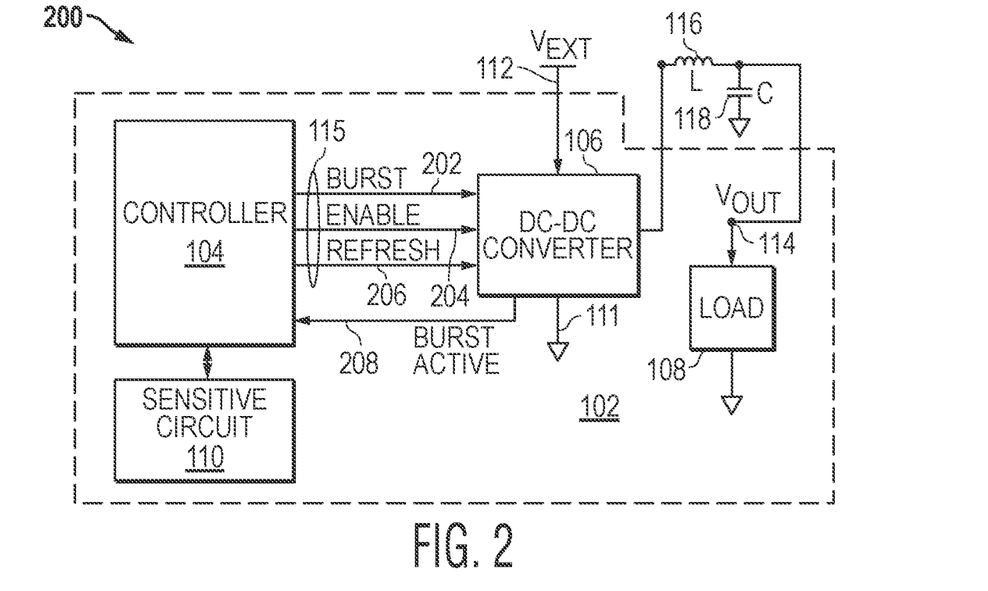
FIG. 2 is a diagram of an example embodiment where the DC-DC converter of FIG. 1A is controlled by a force-burst command that is implemented using one or more control signals.
Figure 3:
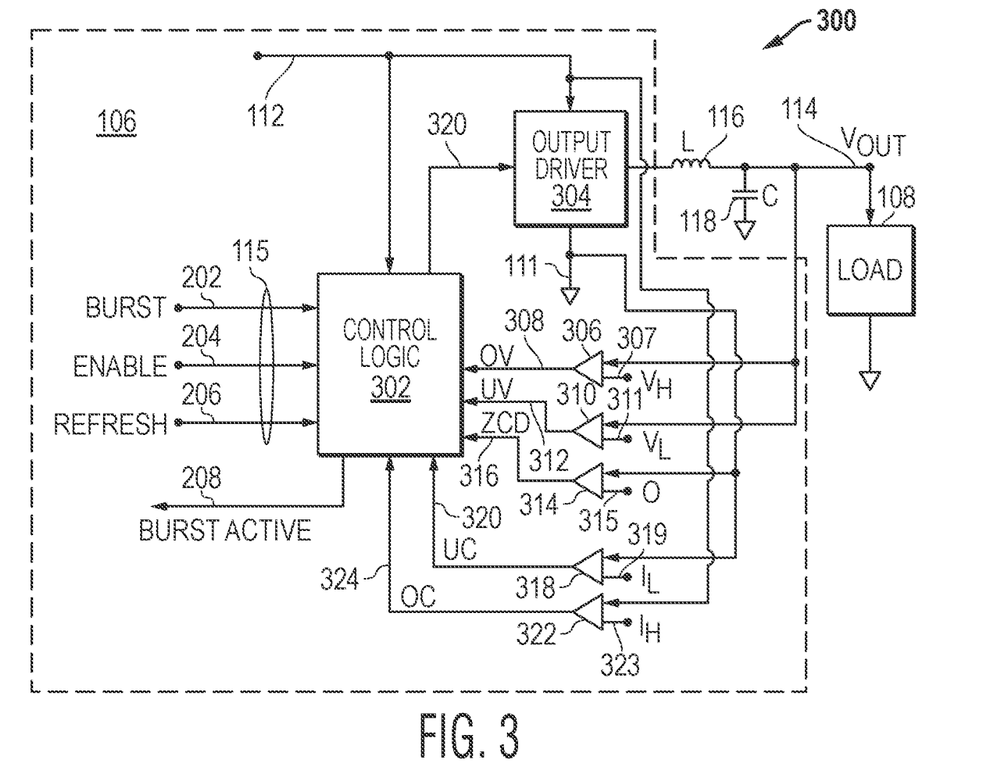
FIG. 3 is a diagram of an example embodiment including further circuit details for the DC-DC converter of FIG. 2.
Figure 4:
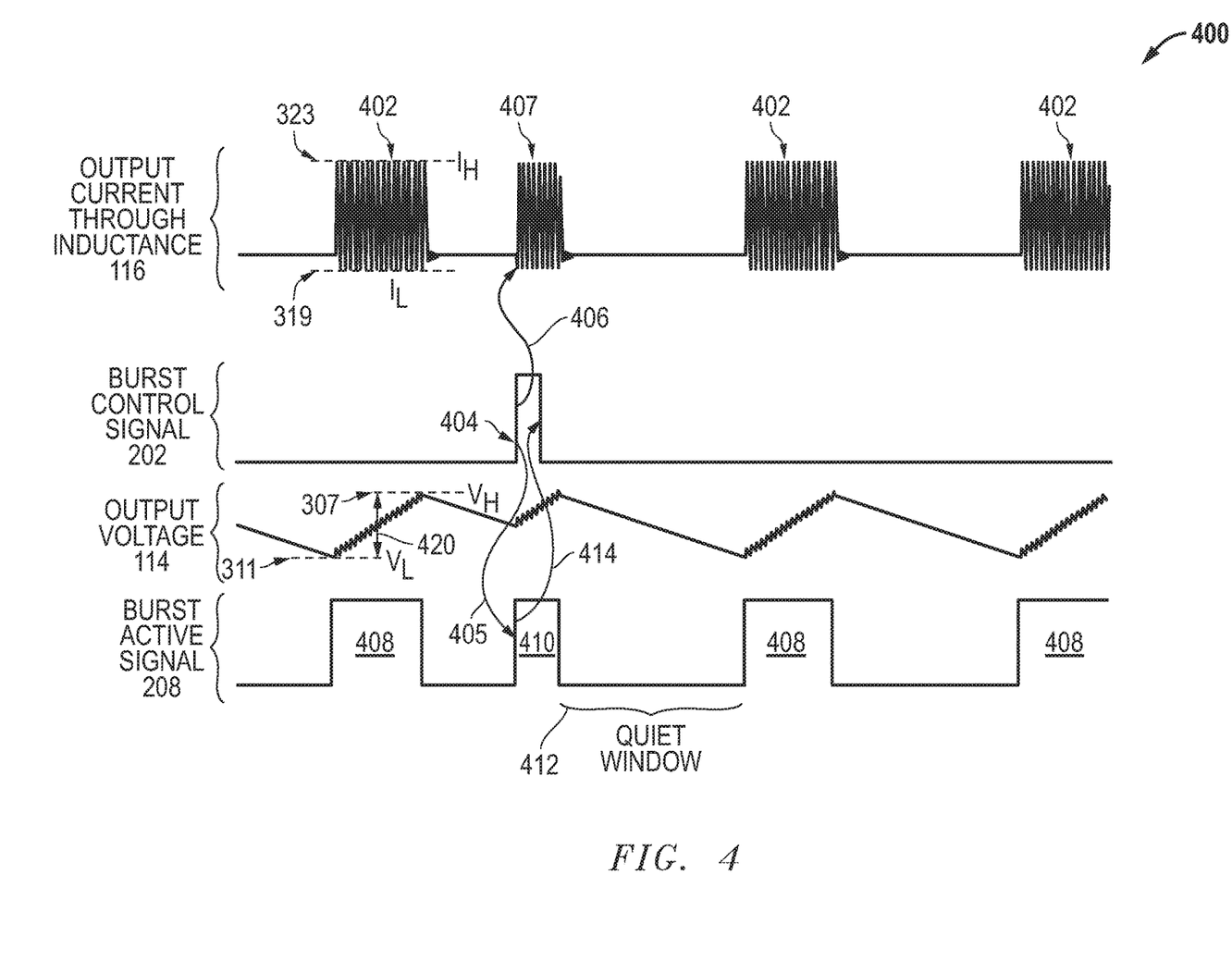
FIG. 4 provides an example timing diagram where a burst control signal is used to force a burst mode to be performed by the DC-DC converter during a normal operation mode.
Figure 5:
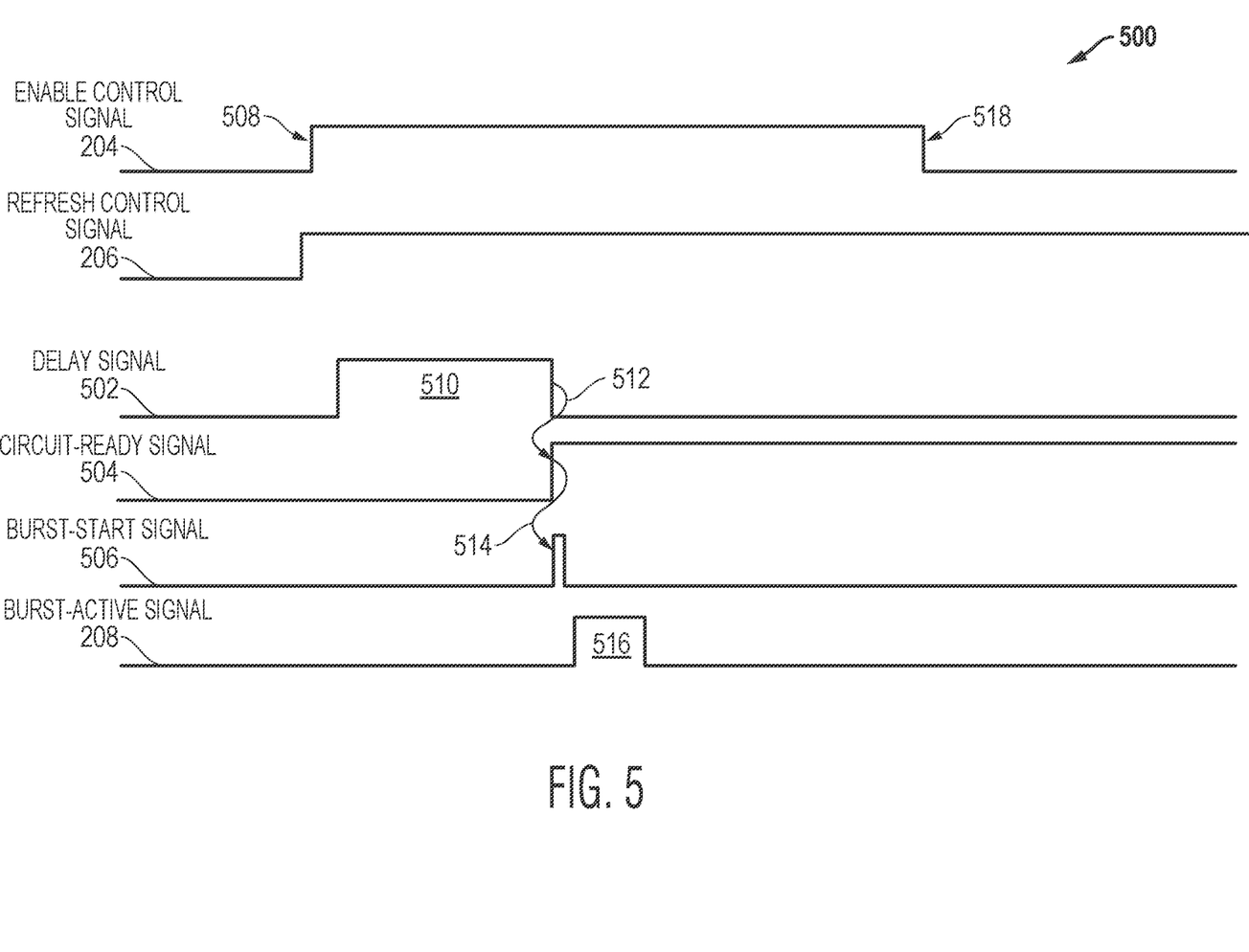
FIG. 5 provides an example timing diagram where enable/refresh control signals are used to force a burst to be performed by the DC-DC converter during a power-down refresh mode.

The embodiments are now described in more detail with respect to the drawings. FIGS. 1A-1B provide general system and method embodiments for the forced-burst mode. FIGS. 2-3 provide more-detailed system and DC-DC converter embodiments where a burst control signal is used to force a burst during normal operations and where enable/refresh control signals are used to force a burst during low-power operations. FIGS. 4-5 provide timing diagrams for the force-burst mode and the low-power mode embodiments of FIGS. 2-3, respectively. The force-burst techniques described herein can be used with any burst-mode DC-DC converter such as a buck converter, a boost converter, a buck-boost converter or other type of burst-mode DC-DC converter. Further, it is noted that the disclosed techniques to force a charge cycle regardless of the state of the regulated voltage output can also be used with other types of DC-DC converters, including switched-capacitor converters, where charge cycles are used to raise an output voltage to a high voltage threshold after detecting that the output fell below a low voltage threshold. For these embodiments, the force-burst mode described herein is implemented more generally as to force a charge cycle. Other variations and advantages can also be implemented while taking advantage of the force-burst mode described herein.

Looking now to FIG. 1A, a block diagram is provided of an example embodiment 100 including an integrated circuit 102 having a DC-DC converter 106 controlled in part by a force-burst command 115. For the example embodiment 100, the force-burst command 115 is asserted by a controller 104, external to the DC-DC converter 106, but on the same integrated circuit 102. Additional control signals 105 can also be communicated between the controller 104 and the DC-DC converter 106 to control in part the operation of the DC-DC converter 106. The DC-DC converter 106 is coupled between an external supply voltage 112 and ground 111. The DC-DC converter 106 operates to charge an output capacitance 118 through an inductance 116 to provide an output voltage 114 to a load 108 within the integrated circuit 102. Typically, the inductance 116 and the capacitance 118 are implemented as off-chip circuits as depicted for example embodiment 100. However, the inductance 116 or the capacitance 118 could also be included within integrated circuit 102 if desired. It is further noted that the inductance 116 can be one or more inductors, and the capacitance 118 can be one or more capacitors. Different or additional circuits can also be included within the integrated circuit 100.

As described herein, the controller 104 can also be coupled to control a circuit 110, which can be a circuit sensitive to interference generated by burst-mode switching of the DC-DC converter 106. As described further below, the sensitive circuit 110 can be used to perform actions associated with the operation of the integrated circuit 102. For one embodiment, the sensitive circuit 110 is an analog-to-digital converter (ADC) that samples an analog input. The controller 104 can be a microcontroller, a processor, a programmable logic device, or other programmable circuit that executes program instructions stored in a non-volatile data storage device to carry out the functions described herein.

FIG. 1B is a flow diagram of an example embodiment 150 to force a burst to be performed by a burst-mode DC-DC converter. In block 152, a force-burst command 115 is asserted to the DC-DC converter 106. As described herein, the force-burst command 115 can be one or more controls signals asserted to the DC-DC converter 106. In block 154, the current mode of operation for the DC-DC converter is interrupted. For one embodiment, the current mode of operation is a normal operation mode where the output voltage 114 is maintained within a voltage regulation window. For another embodiment, the current mode is a low-power refresh mode for the DC-DC converter 106. Other modes of operation can also be interrupted. In block 156, a burst mode is performed by the DC-DC converter 106 to raise the output voltage 114 to a voltage threshold. The voltage threshold can be, for example, a high-voltage threshold used for normal operations to maintain the output voltage 114 within a voltage regulation window. Other voltages can also be used. It is further noted that additional or different process steps can also be used while still taking advantage of the force-burst techniques described herein.

FIG. 2 is a diagram of an example embodiment 200 where the DC-DC converter 106 shown in FIG. 1A is controlled by a force-burst command 115 that is implemented using one or more control signals. For one embodiment, the force-burst command 115 is a burst control signal 202 that is a dedicated control signal configured to force the start of a burst by the DC-DC converter, overruling its conventional control actions. When the burst control signal 202 is asserted by the controller 104, the DC-DC converter 106 is forced to perform a burst irrespective of its internal mode or status. For another embodiment, the force-burst command 115 is asserted by a combination of an enable control signal 204 and a refresh control signal 206. The enable control signal alone is configured to cause the DC-DC converter to turn on for normal operations. The refresh control signal 206 alone is configured to cause the DC-DC converter 106 to turn off for a low-power mode. When the enable control signal 204 is asserted when the refresh control signal 206 is also asserted, the DC-DC converter 106 is forced to perform a burst regardless of whether after being enabled it determines its output voltage to be below the low-voltage threshold or not. For the example embodiment 200, the DC-DC converter 106 also provides a burst-active signal 208 back to the controller 104 to indicate whether the DC-DC converter 106 is currently performing a burst. Alternatively, the DC-DC converter 106 can also signal to controller 104 that a burst has ended.

FIG. 3 is a diagram of an example embodiment 300 including further circuit details for the DC-DC converter 106 of FIG. 2. For embodiment 300, the DC-DC converter 106 includes a control circuit 302 and an output driver 304. The external supply voltage 112 is coupled to the control circuit 302 and to the output driver 304. Control circuit 302 receives the force-burst command 115 and outputs a drive signal 320 to the output driver 304. When the drive signal 320 is active, the output driver 304 charges the capacitance 118 through the inductance 116 to deliver the output voltage 114 to the load 108. As described above, the force-burst command 115 can be provided by the burst control signal 202, the enable/refresh control signals 204/206, or one or more other control signals asserted to the control circuit 302. The control circuit 302 also generates the burst-active signal 208 to indicate the burst-mode status for the DC-DC converter 106. As mentioned previously, this signal can also be a signal that indicates the burst has ended when it is asserted. The control circuit 302 can be implemented as a dedicated logic circuit, dedicated controller, or other hardware digital solution that implements the control actions and functions described herein. The control circuit 302 can also be implemented as a microcontroller, a processor, a programmable logic device, or other programmable circuit that executes program instructions stored in a non-volatile data storage device to carry out the control actions and functions described herein.

For one embodiment, the drive signal 320 is a hysteretic current control signal that drives circuits within the output driver 304. For example, the output driver 304 can be implemented using a positive-side transistor and a negative-side transistor that are alternatingly switched on/off to provide the output voltage 114. For this example embodiment, only the positive-side transistor or the negative-side transistor is preferably conducting at any given time. When the current hits the upper current threshold, the positive-side transistor (switch) is turned off and the negative-side transistor (switch) is turned on. The current then drops, and the reverse happens when the current hits the lower current threshold. This operation continues until the high-voltage threshold is reached, after which the current is ramped down to zero. The switching of the transistors within the output driver 304 can cause interference as described above.

The control circuit 302 can also receive monitor signals to facilitate internal control of the DC-DC converter 106. For example, the control circuit 302 can receive an over-voltage (OV) detection signal 308, an under-voltage (UV) detection signal 312, a zero-current detection (ZCD) signal 316, an under-current (UC) detection signal 320, and an over-current (OC) detection signal 324. The OV detection signal 308 is used to detect when the output voltage 114 rises above a high-voltage threshold 307. For one example detector circuit, a voltage comparator 306 is coupled to receive the output voltage 114 and a high-voltage threshold ($V_H$) 307 as a reference voltage and to output the OV detection signal 308. Alternatively, a voltage divider can be used at the output 114 to divide the output voltage to the valid reference voltage. The UV detection signal 312 is used to detect when the output voltage 114 falls below a low-voltage threshold 311. For one example detector circuit, a voltage comparator 310 is coupled to receive the output voltage 114 and a low-voltage threshold ($V_L$) 311 and to output the UV detection signal 312. As for the OV detection, the same voltage divider can also be used here to compare the output voltage to the low-voltage threshold ($V_L$) 311. The ZCD detection signal 316 is used to indicate when the output current for the output driver 304 has fallen back to zero. For one example detector circuit, a current comparator 314 is coupled to receive a current from the connection path to ground 111 for the output driver 304 and a zero current reference 315 and to output the ZCD detection signal 316. The UC detection signal 320 is used to detect when a low-side current for the output driver 304 falls below a low-current threshold 319. For one example detector circuit, a current comparator 318 is coupled to receive the low-side current received from the connection path to ground 111 and a low-current threshold ($I_L$) as the low-current threshold 319 and to output the UC detection signal 320. Alternatively, this UC comparator 318 can also be used as the ZCD detector after an OV condition has been detected and the burst should end. For example, the low-current threshold ($V_L$) 311 is set to zero, and the same comparator 318 that is used for UC detection during the burst is used as ZCD comparator to end it. The OC detection signal 324 is used to detect when a high-side current for the output driver 304 rises above a high-current threshold 323. For one example detector circuit, a current comparator 322 is coupled to receive the high-side current received from the connection path to the voltage supply 112 and a high-current threshold ($I_H$) as the high-current threshold 323 and to output the OC detection signal 324. Different or additional detection circuits and measurement signals can also be provided depending upon operational functions desired for the DC-DC converter 106. The use of these detection signals for the operation of the DC-DC converter 106 are described in more detail with respect to the timing diagrams of FIGS. 4-5.

FIG. 4 provides an example timing diagram 400 where a burst control signal 202 is used to force a burst mode to be performed by the DC-DC converter 106 during a normal operation mode. FIG. 4 shows the output current ($I_{OUT}$) through the inductance 116, the burst control signal 202, the output voltage 114, and the burst-active signal 208. The controller 104 overrules the general control loop of the DC-DC converter 106 by asserting the burst control signal 202 to force a burst to be performed regardless of the state UV detection signal 312 described in FIG. 3 above. For example, the controller 104 can assert the burst control signal 202 just before a sensitive action needs to be taken to create a quiet window 412 for that sensitive action. After the DC-DC converter 106 signals back to the controller 104 that the burst has ended by de-asserting the burst-active signal 208, the sensitive action can be performed without interference caused by switching of the circuits operating within the DC-DC converter 106.

During normal operations, the DC-DC converter 106 controls the output voltage 114 within a voltage regulation window 420 between the high-voltage threshold ($V_H$) 307 and the low-voltage threshold ($V_L$) 311. This control is provided through burst events 402 for the DC-DC converter 106. During these burst events 402, the output current through inductance 116 is kept between a high-current threshold ($I_H$) 323 and the low-current threshold ($I_L$) 319. During these burst events 402, the output voltage 114 rises from low-voltage threshold ($V_L$) 311 to the high-voltage threshold ($V_H$) 307. Also during this time, the DC-DC converter 106 asserts and de-asserts the burst-active signal 208 to indicate when the burst begins and ends as shown by pulses 408.

Between these normal burst events 402, the DC-DC converter 106 can be forced to perform a burst by assertion of the burst control signal 202 by a circuit that is external to the DC-DC converter 106. When the burst control signal 202 is asserted by an external circuit as indicated by arrow 404, the burst-active signal 208 is asserted by the DC-DC converter 106 as represented by arrow 405, and a burst 407 is started as indicated by arrow 406 even though the output voltage 114 has not dropped below the low-voltage threshold ($V_L$) 311. This burst event 407 is therefore shorter in duration than a normal burst event 402, assuming a constant load current for all bursts shown in FIG. 4. The assertion and de-assertion of the burst-active signal 208 will also be shorter as indicated by pulse 410 compared to pulses 408. Further, when the assertion of the burst-active signal 208 is received by the external controller 104, the burst control signal 202 is de-asserted as indicated by arrow 414. As soon as the high-voltage threshold ($V_H$) 307 is reached, the burst-active signal 208 goes low again, which signals the controller 104 that quiet window 412 is available. During this quiet window 412, sensitive actions, such as ADC sampling, can take place. The available time within the quiet window 412 depends on the load current and output capacitance 118. As shown, the DC-DC converter 106 will start a new burst through normal internal control as soon as the output voltage 114 reaches the low-voltage threshold ($V_L$) 311.

For the embodiment of FIG. 4, therefore, the burst control signal 202 overrules the output of the UV comparator 310 in FIG. 3 to start the burst 407. The burst-active signal 208 is also asserted at the start of the burst. When the OV comparator 306 detects that the output voltage 114 has reached the high-voltage threshold ($V_H$) 307, the burst mode is ended as shown by the end of burst event 407. The output driver 304, however, can be kept on until the ZCD detection signal 316 indicates that a zero current has been detected by the comparator 314 in FIG. 3. When that happens, the burst mode can be deemed completed, and the DC-DC converter 106 de-asserts the burst-active signal 208. It is further noted assertion of a burst-done signal could also be used by the DC-DC converter 106 to indicate to controller 104 that the burst mode has completed, and this burst-done signal can be in addition or an alternative to the burst-active signal 208. For one further embodiment, when the OV detection signal 308 is asserted, the burst-done signal is asserted and the burst-active signal 208 is de-asserted. When the controller 104 receives the de-assertion of the burst-done signal, the controller 104 de-asserts the burst-control signal 202. The controller 104 can subsequently re-assert the burst-control signal 202 if another force-burst mode is desired. Other variations and additional, different, or fewer control signal can also be used while still taking advantage of the force-burst techniques described herein.

FIG. 5 provides an example timing diagram 500 where the enable/refresh control signals 204/206 are used to force a burst to be performed by the DC-DC converter 106 during a power-down refresh mode. This force-burst operation can be used to create a very efficient ultra-low-power mode at very low load currents. The enable control signal 204, the refresh control signal 206, and the burst-active signal 208 are shown in FIG. 5 along with a delay signal 502, a circuit-ready signal 504, and a burst-start signal 506.

When the refresh control signal 206 is asserted by an external circuit, the DC-DC converter 106 enters a power-down refresh mode. The DC-DC converter 106 is powered down during this refresh mode to reduce the overall quiescent current for the integrated circuit 102. Moreover, the output driver 304 remains in a high-impedance state such that the output voltage 114 is maintained by the charge stored in output capacitor 118. If the enable control signal 204 is asserted by an external circuit while the refresh control signal 206 is also asserted as indicated by arrow 508, the DC-DC converter 106 is forced to perform a burst mode. This condition causes the DC-DC converter 106 to enter a burst mode regardless of the state UV detection signal 312 described in FIG. 3 above. Thus, similar to the embodiment of FIG. 4, the enable/refresh control signals 204/206 are used to assert a force-burst command to start a burst mode that refreshes the charge in output capacitor 118 thereby maintaining output voltage 114.

Prior to initiating this burst mode, however, the DC-DC converter 106 can be required to wait a delay period 510 to allow a start-up cycle for internal circuits. During this period, other actions can also be taken, such as for example, auto-zero actions to lower the offset of comparators. This delay period 510 can be determined by asserting and de-asserting a delay signal 502. After this delay period 510, internal circuits have been given time to start up, and a circuit ready signal 504 can be triggered as indicated by arrow 512. The assertion of the ready signal 504 further triggers assertion of a start pulse within the burst-start signal 506 internal to the DC-DC converter as indicated by arrow 514. Similar to the description for FIG. 4 above, the DC-DC converter 106 performs a burst mode to increase the output voltage 114, and the burst mode ends when the output voltage 114 has reached the high-voltage threshold ($V_H$) 307. The burst-active signal 208 is asserted when the burst mode begins and is de-asserted when the burst mode ends as indicated by pulse 516 within burst-active signal 208. To maintain ultra-low-power operation of the DC-DC converter 106, the DC-DC converter 106 may internally disable itself in this refresh mode directly after the burst has ended, after which the external controller can properly disable the DC-DC converter 106 as indicated by arrow 518 in FIG. 5. This operation may be applicable, for example, when the external controller runs at such low clock periods to save power that the timing granularity of switching the DC-DC converter 106 on and off is too low to benefit from the low-power aspects of the DC-DC converter refresh mode. The internal disabling of the DC-DC converter 106 is not shown in FIG. 5 but could be tied to de-assertion of the burst-active signal 208. Other variations could also be implemented.

It is noted that FIGS. 4-5 are described with signals being asserted with high logic levels and de-asserted with low logic levels. If desired, one or more of these signals could be implemented such that assertion is a low logic level and de-assertion is a high logic level. Further, the control signals could be adjusted to indicate an opposite action. For example, as indicated above a burst-end signal could be used instead of de-assertion of a burst-active signal. Additional or different variations could also be implemented while still taking advantage of the techniques described herein.

As described herein, a variety of embodiments can be implemented and different features and variations can be implemented, as desired.

For one embodiment, a system for an integrated circuit is disclosed including a direct-current-to-direct-current (DC-DC) converter and a controller. The direct-current-to-direct-current (DC-DC) converter has an output voltage and a burst mode to raise the output voltage to a threshold voltage, and the burst mode includes one or more current charging cycles. The controller is coupled to the DC-DC converter and has a force-burst command as an output. The DC-DC converter is configured to perform the burst mode based upon a low-voltage detection for the output voltage, and the DC-DC converter is further configured to perform the burst mode when the force-burst command is asserted by the controller regardless of a state for the low-voltage detection.

In additional embodiments, the system also includes a load coupled to the output voltage of the DC-DC converter, an inductance coupled between the load and the DC-DC converter, and a capacitance coupled between the output voltage and ground.

In additional embodiments, the DC-DC converter includes a control circuit having the force-burst command as an input and having a drive signal as an output, and the DC-DC converter includes an output driver having the drive signal as an input and coupled to provide the output voltage. In further embodiments, the output driver includes a positive-side transistor and a negative-side transistor driven that are alternatingly switched on and off during operation.

In additional embodiments, the force-burst command includes assertion of a burst control signal to the DC-DC converter. In further embodiments, the controller is configured to assert the burst control signal to the DC-DC converter to initiate a quiet period. In still further embodiments, the system includes a circuit sensitive to interference, and the circuit is controlled to perform an action during the quiet period. In further embodiments, the circuit is an analog-to-digital converter.

In additional embodiments, the force-burst command includes assertion of an enable control signal to the DC-DC converter while a refresh control signal to the DC-DC converter is also asserted. The refresh control signal alone causes the DC-DC converter to turn off for a low-power mode, and the enable control signal alone causes the DC-DC converter to turn on for normal operations. In further embodiments, the controller is configured to assert the force-burst command to reduce quiescent power consumption for the integrated circuit during the low-power mode.

For one embodiment, a direct-current-to-direct-current (DC-DC) converter within an integrated circuit is disclosed including a control circuit and an output driver. The control circuit has a force-burst command from an external circuit as an input and has a drive signal as an output. The output driver has the drive signal as an input and is coupled to provide an output voltage to a load. The control circuit causes the DC-DC converter to perform a burst mode based upon a low-voltage detection for the output voltage, and the control circuit causes the DC-DC converter to perform the burst mode when the force-burst command is asserted regardless of a state for the low-voltage detection.

In additional embodiments, the output driver includes a positive-side transistor and a negative-side transistor that are alternatingly switched on and off during operation. In further additional embodiments, the force-burst command includes assertion of a burst control signal to the DC-DC converter.

In additional embodiments, the force-burst command includes assertion of an enable control signal to the DC-DC converter while a refresh control signal to the DC-DC converter is also asserted. The refresh control signal alone causes the DC-DC converter to turn off for a low-power mode, and the enable control signal alone causes the DC-DC converter to turn on for normal operations.

In additional embodiments, the DC-DC converter also includes a comparator having the output voltage and a reference voltage as inputs, and the comparator has an under-voltage detection signal as an output to the control circuit for the low-voltage detection.

For one embodiment, a method for an integrated circuit is disclosed including providing an output voltage to a load within an integrated circuit using a direct-current-to-direct-current (DC-DC) converter, performing a burst mode with the DC-DC converter to raise the output voltage to a threshold voltage based upon a low voltage detection for the output voltage, and also performing the burst mode with the DC-DC converter when a force-burst command is asserted to the DC-DC converter regardless of a state for the low-voltage detection.

In additional embodiments, the method includes operating DC-DC converter to keep the output voltage within a voltage regulation window having a high-voltage threshold and a low-voltage threshold.

In additional embodiments, the method includes asserting the force-burst command by asserting a burst control signal to the DC-DC converter. In further embodiments, the method includes performing an action with a circuit sensitive to interference during a quiet period after completion of the burst-mode performed due to assertion of the burst control signal.

In additional embodiments, the method includes asserting the force-burst command by asserting an enable control signal to the DC-DC converter while a refresh control signal to the DC-DC converter is also asserted, using the refresh control signal alone to cause the DC-DC converter to turn off for a low-power mode, and using the enable control signal alone to cause the DC-DC converter to turn on for normal operations.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), controllers, microcontrollers, microprocessors, hardware accelerators, ASIC s (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A system for an integrated circuit, comprising:
   a direct-current-to-direct-current (DC-DC) converter having an output voltage and a burst mode to raise the output voltage to a threshold voltage, the burst mode comprising one or more current charging cycles; and
   a controller coupled to the DC-DC converter and having a force-burst command as an output;
   wherein the DC-DC converter is configured to perform the burst mode based upon a low-voltage detection for the output voltage;
   wherein the DC-DC converter is further configured to perform the burst mode when the force-burst command is asserted by the controller regardless of a state for the low-voltage detection; and
   wherein the force-burst command comprises assertion of an enable control signal to the DC-DC converter while a refresh control signal to the DC-DC converter is also asserted, the refresh control signal alone causing the DC-DC converter to turn off for a low-power mode, and the enable control signal alone causing the DC-DC converter to turn on for normal operations.

2. The system of claim 1, further comprising a load coupled to the output voltage of the DC-DC converter, an inductance coupled between the load and the DC-DC converter, and a capacitance coupled between the output voltage and ground.

3. The system of claim 1, wherein the DC-DC converter comprises:
   control logic having the force-burst command as an input and having a drive signal as an output; and
   an output driver having the drive signal as an input and being coupled to provide the output voltage to the load.

4. The system of claim 3, wherein the output driver comprises a positive-side transistor and a negative-side transistor driven that are alternatingly switched on and off during operation.

5. The system of claim 1, wherein the force-burst command comprises assertion of a burst control signal to the DC-DC converter.

6. The system of claim 5, wherein the controller is configured to assert the burst control signal to the DC-DC converter to initiate a quiet period.

7. The system of claim 6, further comprising a circuit sensitive to interference, the circuit being controlled to perform an action during the quiet period.

8. The system of claim 7, wherein the circuit is an analog-to-digital converter.

9. The system of claim 1, wherein the controller is configured to assert the force-burst command to reduce quiescent power consumption for the integrated circuit during the low-power mode.

10. A direct-current-to-direct-current (DC-DC) converter within an integrated circuit, comprising:
    control logic having a force-burst command from an external circuit as an input and having a drive signal as an output; and
    an output driver having the drive signal as an input and being coupled to provide an output voltage to a load;
    wherein control logic causes the DC-DC converter to perform a burst mode based upon a low-voltage detection for the output voltage;
    wherein control logic causes the DC-DC converter to perform the burst mode when the force-burst command is asserted regardless of a state for the low-voltage detection; and
    wherein the force-burst command comprises assertion of an enable control signal to the DC-DC converter while a refresh control signal to the DC-DC converter is also asserted, the refresh control signal alone causing the DC-DC converter to turn off for a low-power mode, and the enable control signal alone causing the DC-DC converter to turn on for normal operations.

11. The DC-DC converter of claim 10, wherein the output driver comprises a positive-side transistor and a negative-side transistor that are alternatingly switched on and off during operation.

12. The DC-DC converter of claim 10, wherein the force-burst command comprises assertion of a burst control signal to the DC-DC converter.

13. The DC-DC converter of claim 10, further comprising a comparator having the output voltage and a reference voltage as inputs and having a under-voltage detection signal as an output to the control logic for the low-voltage detection.

14. A method for an integrated circuit, comprising:
    providing an output voltage to a load within an integrated circuit using a direct-current-to-direct-current (DC-DC) converter;

performing a burst mode with the DC-DC converter to raise the output voltage to a threshold voltage based upon a low voltage detection for the output voltage;

also performing the burst mode with the DC-DC converter when a force-burst command is asserted to the DC-DC converter regardless of a state for the low-voltage detection; and asserting the force-burst command by asserting an enable control signal to the DC-DC converter while a refresh control signal to the DC-DC converter is also asserted, using the refresh control signal alone to cause the DC-DC converter to turn off for a low-power mode, and using the enable control signal alone to cause the DC-DC converter to turn on for normal operations.

15. The method of claim 14, further comprising operating DC-DC converter to keep the output voltage within a voltage regulation window having a high-voltage threshold and a low-voltage threshold.

16. The method of claim 14, further comprising asserting the force-burst command by asserting a burst control signal to the DC-DC converter.

17. The method of claim 16, further comprising system performing an action with a circuit sensitive to interference during a quiet period after completion of the burst-mode performed due to assertion of the burst control signal.

\* \* \* \* \*